S. U. King,
Wood Molding Machine,
N° 44,870. Patented Nov. 1, 1864.
Fig. 1.
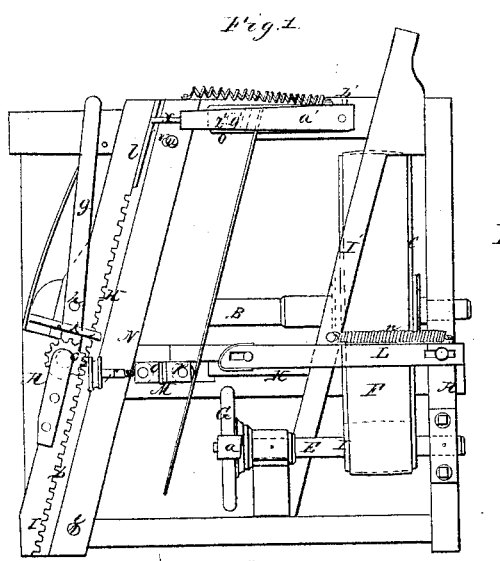
Fig. 3.
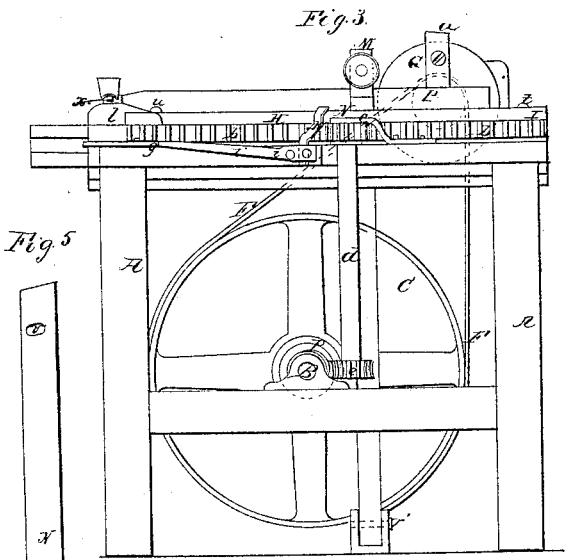
Fig. 5.
Fig. 2.
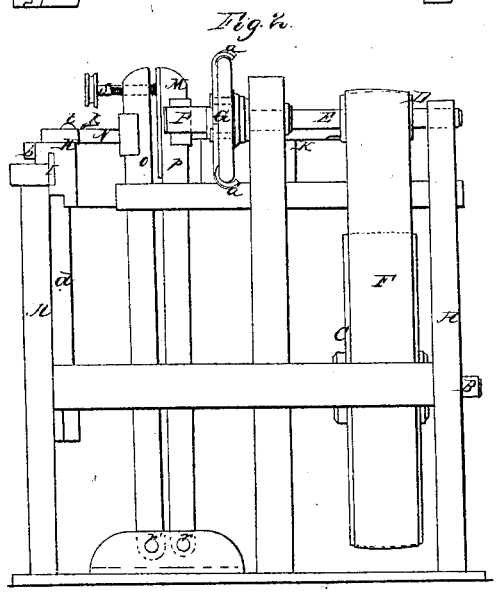
Fig. 4.
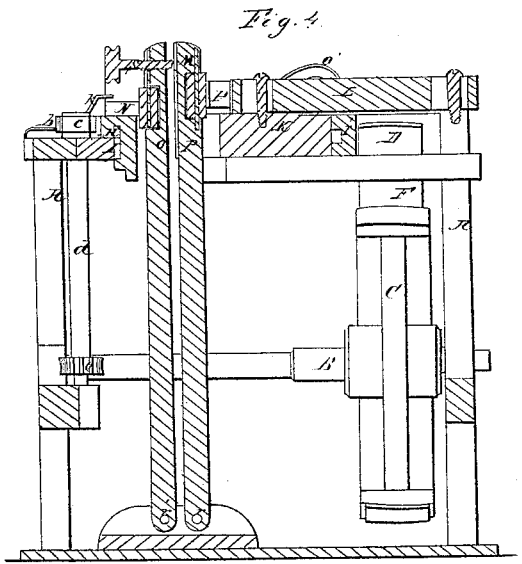
Witnesses.
Frederick Curtis
P. Hale Jr
Inventor.
Sam'l U. King
by his attorney
R. H. Eddy

UNITED STATES PATENT OFFICE.

SAMUEL U. KING, OF WINDSOR, VERMONT.

IMPROVEMENT IN PLANING-MACHINES.

Specification forming part of Letters Patent No. 44,870, dated November 1, 1864.

*To all whom it may concern:*

Be it known that I, SAMUEL U. KING, a resident of the town and county of Windsor, and State of Vermont, have invented a new and useful machine for dressing or hewing timber or articles of curved or irregular shape; and I do hereby declare the same to be fully described in the following specification and represented in the accompanying drawings, of which—

Figure 1 is a top view, Fig. 2 a front elevation, and Fig. 3 a side elevation, of it. Fig. 4 is a vertical and transverse section of such machine, the plane of section being taken through the expansive rest, to be hereinafter described. Fig. 5 is a longitudinal section of the self-adjusting back support, to be hereinafter explained.

The nature of the principal portion of my invention is a machine consisting as follows, viz: First, a rotary cutter or cutter-wheel; second, a carriage and ways arranged at an inclination with respect to the plane of revolution of the cutter or cutters; third, a rest independent of the carriage and for supporting the article to be cut or dressed while being moved along by the carriage; fourth, an auxiliary or side rest for supporting the said article while being moved and cut; fifth, a presser; sixth, an adjustable mechanism, by which a piece of wood or other material while being reduced by the rotary cutter or cutters and from end to end is caused to be cut or dressed tapering or thicker at one than at the other end of it; seventh, a self-adjusting back-support to the carriage, the whole of the said elements being provided with machinery for operating the carriage and cutter-wheel, substantially in manner as hereinafter described.

My invention further consists in constructing the auxiliary rest so as to be expansive or adjustable with reference to the cutters, in order that successive cuts or dressings may be taken by the cutters; and my invention further consists in the application of an "evener" to the machine, the said evener being a thin spring or strip of metal affixed at one end to the carriage, and supported on the main rest and between the auxiliary rest and the presser, the purpose of the evener being to serve as a bridge to span over the various small irregularities of one side of the piece or article to be dressed, in order that the cutters may not produce counter irregularities on the opposite side of such piece or article.

In the drawings, A denotes the frame of the machine, within which there is placed and properly supported a driving-shaft, B, carrying a wheel, C, around which and another wheel, D, fixed on a cutter-shaft or mandrel, E, an endless belt, F, travels and imparts motion from the driving-shaft to the said cutter-shaft. A cutter-head, G, fixed on the inner end of the shaft E, supports one or more cutters, *a a*, which, with the head, are put in revolution when the said shaft is revolved. A carriage, H, supported by stationary parallel ways I I', inclined to or making an acute angle with the axis of the cutter-shaft, or arranged with respect to such shaft in manner as shown in the drawings, is to sustain the piece or article to be dressed or cut, and is to be moved with a regular motion, so as to carry the article along with respect to the cutters, in order that while they may be in rotation their reduction of the said article may be progressive on one side of it and from one to the other end of that side.

For effecting the movement of the carriage, there is a toothed rack, *b*, which is applied to one side of it, and is made to engage with a pinion, *c*, carried by an upright shaft, *d*. A worm-gear, *e*, fixed on the said shaft, engages with a screw or worm, *f*, fixed on the driving-shaft.

The upper bearing of the shaft *d* is in a lever, *g*, which is arranged on the top of the frame A, in manner as shown in the drawings, the fulcrum of the lever being at *h*. A spring, *i*, projecting from the frame A, bears against the edge of the longer arm of the lever, and is for so actuating the lever as to cause the pinion *c* to be thrown out of gear with the rack, such pinion being held in engagement with the rack by means of a spring-latch, *k*, which, at or near the termination of a forward movement of the carriage, will be elevated or unlatched from the lever by means of a cam, *l*, projecting from the carriage and moved by the carriage against the latch. In rear of the rotary cutter-head there is a stationary rest, K, on which there is placed a presser, L, which is forced toward an auxiliary rest, M, by means of a spring, *n*, the two rests K and M being arranged as represented in Fig. 4.

The rest M, as shown in the drawings, is composed of two upright bars, o p, within each of which, and near its upper end, there is a friction roller, q or q'. Each of the bars o p is supported at its lower end on a center pin, r or r', and so as to be capable of being vibrated either toward or away from the presser L. A screw, s, is screwed through the bar o and against the bar p, and serves to expand the rest M or move the two bars o p more or less apart from one another. The roller of the bar o abuts against the edge of an adjustable guide or bar, N, which is arranged on the carriage H, and is held thereto by screws t u, which go through the bar and screw into the carriage. One of these screws— viz., that marked u—goes through a slot, v, (made transversely in the bar,) and serves as a clamp for fixing the bar in place. By moving the rear end of the bar N so as to cause the said bar to more or less approach the bar o of the rest M, we are enabled to adjust the bar N on the carriage. The said bar, after having been so adjusted, should be fixed in position by means of a clamp-screw. The object of the said bar N is to cause the rest M to be moved gradually toward the presser, while the carriage may be performing a forward movement, the same being in order to cause the stick or article to be tapered or reduced to a tapering form, as occasion may require.

By screwing forward the screw s the bar p of the movable rest M will be moved nearer to the presser. In this case we either can regulate the depth of the cut of the cutters or cause them to remove successive layers or shavings from the side of the article in order to reduce it by more than one cut, extending from end to end of it.

The carriage H has a self-adjusting back support, O, which is a piece of wood provided with a clamp, x, and held to the carriage by means of a screw, y, which passes through a slot, z, (made in the said support o,) and is screwed into the carriage. The support o also has a spring, a', attached to its outer end and to the carriage, such spring serving to draw the supporter not only in a longitudinal direction, but laterally up to a stud, b', arranged as shown in Fig. 1. The support O can turn horizontally on the screw y as a center as well as move longitudinally thereon. Furthermore, there is a long spring or thin piece or band of flexile steel, P, attached at one end to the support O, and extending between the rest M and the presser L, in manner as shown in the drawings. This piece of steel I term the "evener," the purpose of which has been hereinbefore explained.

With my said machine a piece of wood suitable for a "scythe-snath" or other irregular object can readily be dressed or reduced on either of its sides. While being reduced the piece of wood is to be sustained on the self-adjusting back support, O, and also on the stationary rest K, the piece being fastened to the back support, O, by the lever-clamp x. The said piece will be forced toward the rest M by the presser, and with the evener will be kept up to the said rest, while the carriage may be making a forward movement. The self-adjusting support O, although holding the piece of wood firmly, will allow it to vibrate or move laterally in either direction, as circumstances may require, in order to have the cutters reduce it from end to end and along its side, however curved the said piece may be.

By the arrangement of the supporting-ways of the carriage—viz., at an acute angle with respect to the axis of the cutter shaft—the piece of wood while being cut will be able to vibrate more or less without obstruction from the cutter-head. The cutters, while in operation, will dress the stick either in a line parallel to or tapering with respect to the general face of the stick, which may be in contact with the evener. Furthermore, the forward motion of the carriage will be arrested at the proper time by the action of the cam l on the spring-latch k.

I claim as my invention—

1. The machine or combination of mechanical elements as follows, viz: the cutter-wheel G, the carriage H, the ways I I', (inclined with respect to the cutter-shaft in manner as specified,) the main and auxiliary rests K M, the presser L, the self-adjusting back support, O, and the adjustable bar N, the same being arranged together and having operating mechanism substantially as specified.

2. The auxiliary rest M, as made, so as to be expansible with reference to the cutters, in the manner and for the purpose as set forth.

3. The combination of the evener P with the rotary cutter-wheel, the carriage and its ways, (inclined with respect to the shaft in manner as specified,) the main and auxiliary rests and the presser.

SAMUEL U. KING.

Witnesses:
F. P. HALE, Jr.,
R. H. EDDY.